United States Patent
Zhao (10) Patent No.: US 10,922,236 B2
(45) Date of Patent: Feb. 16, 2021

(54) CASCADE CACHE REFRESHING

(71) Applicant: Advanced New Technologies Co., Ltd., Grand Cayman (KY)

(72) Inventor: Yangyang Zhao, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/811,590

(22) Filed: Mar. 6, 2020

(65) Prior Publication Data

US 2020/0320011 A1 Oct. 8, 2020

Related U.S. Application Data

(63) Continuation of application No. PCT/CN2020/071159, filed on Jan. 9, 2020.

(30) Foreign Application Priority Data

Apr. 4, 2019 (CN) .......................... 201910269207.1

(51) Int. Cl.
*G06F 3/06* (2006.01)
*G06F 12/00* (2006.01)
(Continued)

(52) U.S. Cl.
CPC ...... *G06F 12/0891* (2013.01); *G06F 12/0811* (2013.01); *G06F 12/0815* (2013.01); *G06F 12/0893* (2013.01)

(58) Field of Classification Search
CPC ............. G06F 12/0891; G06F 12/0811; G06F 12/0815; G06F 12/0893
(Continued)

(56) References Cited

U.S. PATENT DOCUMENTS

| | | | |
|---|---|---|---|
| 6,681,293 B1* | 1/2004 | Solomon | G06F 12/0811 711/120 |
| 8,806,138 B1* | 8/2014 | Colby | G06F 12/0837 711/133 |

(Continued)

FOREIGN PATENT DOCUMENTS

| | | |
|---|---|---|
| CN | 1484155 | 3/2004 |
| CN | 102156735 | 8/2011 |

(Continued)

OTHER PUBLICATIONS

PCT International Search Report and Written Opinion in International Application No. PCT/CN2020/071159, dated Apr. 15, 2020, 22 pages (with machine translation).

(Continued)

*Primary Examiner* — Mohamed M Gebril
(74) *Attorney, Agent, or Firm* — Fish & Richardson P.C.

(57) ABSTRACT

The present application discloses a cascade cache refreshing method, system, and device. The method in an embodiment of the present specification includes: determining a cache refreshing sequence based on a dependency relationship between caches in a cascade cache; and sequentially determining, based on the cache refreshing sequence, whether the caches in the cascade cache need to be refreshed, and refreshing a cache that needs to be refreshed, where when it is determined that a current cache needs to be refreshed, it is determined whether a cache following the current cache in the cache refreshing sequence needs to be refreshed after the current cache is refreshed.

27 Claims, 6 Drawing Sheets

(51) Int. Cl.
  *G06F 13/00* (2006.01)
  *G06F 12/0891* (2016.01)
  *G06F 12/0815* (2016.01)
  *G06F 12/0811* (2016.01)
  *G06F 12/0893* (2016.01)

(58) Field of Classification Search
  USPC .......................................................... 711/135
  See application file for complete search history.

(56) References Cited

U.S. PATENT DOCUMENTS

| | | | | |
|---|---|---|---|---|
| 10,152,422 | B1* | 12/2018 | Sampathkumar ... | G06F 12/0882 |
| 10,176,241 | B2* | 1/2019 | Massarenti ............. | G06F 16/27 |
| 2003/0233493 | A1* | 12/2003 | Boldon ..................... | G06F 8/60 |
| | | | | 710/1 |
| 2004/0162943 | A1 | 8/2004 | Degenaro et al. | |
| 2005/0015463 | A1* | 1/2005 | Smith ................. | G06F 16/9574 |
| | | | | 709/219 |
| 2009/0106495 | A1* | 4/2009 | Chou ................. | G06F 9/30043 |
| | | | | 711/130 |
| 2009/0193187 | A1* | 7/2009 | Barth, Jr. ............. | G06F 12/0897 |
| | | | | 711/106 |
| 2012/0198164 | A1* | 8/2012 | Damodaran ........ | H03M 13/353 |
| | | | | 711/122 |
| 2015/0143046 | A1 | 5/2015 | Hagersten et al. | |
| 2015/0293964 | A1* | 10/2015 | Morfonios .......... | G06F 11/3409 |
| | | | | 707/753 |
| 2015/0378780 | A1 | 12/2015 | Busaba et al. | |
| 2016/0004639 | A1* | 1/2016 | Vorbach .............. | G06F 12/0893 |
| | | | | 711/122 |
| 2017/0168941 | A1* | 6/2017 | Kwack ................ | G06F 12/0822 |
| 2017/0255557 | A1 | 9/2017 | Robinson et al. | |
| 2017/0344481 | A1* | 11/2017 | Pack, III ................ | G06F 16/00 |
| 2018/0095895 | A1* | 4/2018 | Pugsley ................ | G06F 12/126 |

FOREIGN PATENT DOCUMENTS

| | | |
|---|---|---|
| CN | 102902741 | 1/2013 |
| CN | 106126568 | 11/2016 |
| CN | 106202112 | 12/2016 |
| CN | 108600320 | 9/2018 |
| CN | 108897495 | 11/2018 |
| CN | 109154910 | 1/2019 |
| CN | 109240946 | 1/2019 |
| CN | 109446448 | 3/2019 |
| CN | 110059023 | 7/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

CASCADE CACHE REFRESHING

CROSS-REFERENCE TO RELATED APPLICATIONS

This application is a continuation of PCT Application No. PCT/CN2020/071159, filed on Jan. 9, 2020, which claims priority to Chinese Patent Application No. 201910269207.1, filed on Apr. 4, 2019, and each application is hereby incorporated by reference in its entirety.

TECHNICAL FIELD

The present specification relates to the field of computer technologies, and in particular, to cascade cache refreshing methods, systems, and devices.

BACKGROUND

A cache is a storage that can exchange data at a high speed. In an example of an application scenario of a hard disk, a cache is a memory chip on a hard disk controller, and has a very high access rate. The cache is a buffer between internal storage of the hard disk and an external interface. Because an internal data transmission rate of the hard disk is different from a transmission rate of the external interface, the cache serves as a buffer. A size and a rate of the cache are important factors that directly affect the transmission rate of the hard disk, and can greatly improve overall performance of the hard disk. When the hard disk accesses fragmentary data, data needs to be continuously exchanged between the hard disk and a memory. If there is a large cache, the fragmentary data can be temporarily stored in the cache, to reduce system load and improve a data transmission rate.

SUMMARY

Embodiments of the present specification provide cascade cache refreshing methods, systems, and devices, to alleviate a problem in a cascade cache refreshing process in the existing technology.

The following technical solutions are used in the embodiments of the present specification.

An embodiment of the present specification provides a cascade cache refreshing method, where the method includes: sequentially determining, based on a cache refreshing sequence, whether caches in a cascade cache need to be refreshed, and refreshing a cache that needs to be refreshed, where the cache refreshing sequence is determined based on a dependency relationship between the caches in the cascade cache; and when it is determined that a current cache needs to be refreshed, determining whether a cache following the current cache in the cache refreshing sequence needs to be refreshed after the current cache is refreshed.

In an embodiment of the present specification, sequentially determining, based on the cache refreshing sequence, whether the caches in the cascade cache need to be refreshed comprises determining whether each cache in the cascade cache needs to be refreshed.

In an embodiment of the present specification, the method further includes: detecting whether a circular dependency conflict exists, and terminating cache refreshing when a circular dependency conflict exists, where when a cache used as a start point can be traced through cache tracing based on the dependency relationship by using any cache as a start point, the circular dependency conflict exists.

In an embodiment of the present specification, the method further includes: determining a cache priority based on the dependency relationship, and determining the cache refreshing sequence based on all cache priorities, where a cache that does not depends on any cache has a highest priority; and when a first cache depends on a second cache, a priority of the first cache is lower than a priority of the second cache.

In an embodiment of the present specification, the sequentially determining, based on the cache refreshing sequence, whether each cache in the cascade cache needs to be refreshed includes: determining, based on a cache that the cache depends on, whether the cache needs to be refreshed; and/or determining whether the cache is externally triggered to be refreshed.

In an embodiment of the present specification, the sequentially determining, based on the cache refreshing sequence, whether each cache in the cascade cache needs to be refreshed includes: determining whether the cache is externally triggered to be refreshed, and when the cache is not externally triggered to be refreshed, determining, based on a cache that the cache depends on, whether the cache needs to be refreshed.

In an embodiment of the present specification, the method further includes: adding a refreshing tag to a refreshing target when cache refreshing is externally triggered; and determining whether the cache is externally triggered to be refreshed, where it is determined whether the cache has the refreshing tag; and the method further includes: canceling the refreshing tag after a cache with the refreshing tag is refreshed.

In an embodiment of the present specification, it is determined, based on the cache that the cache depends on, whether the cache needs to be refreshed, where the first cache needs to be refreshed when there is a cache whose refreshing time is later than a refreshing time of the first cache among all caches that the first cache depends on.

An embodiment of the present specification further proposes a cascade cache refreshing system, where the system includes: a refreshing sorting module, configured to determine a cache refreshing sequence based on a dependency relationship between caches in a cascade cache; and a refreshing module, configured to sequentially determine, based on the cache refreshing sequence, whether the caches need to be refreshed, and refresh a cache that needs to be refreshed, where when it is determined that a current cache needs to be refreshed, it is determined whether a cache following the current cache in the cache refreshing sequence needs to be refreshed after the current cache is refreshed.

In an embodiment of the present specification, the system further includes: a circular dependency detection unit, configured to detect whether a circular dependency conflict exists, and terminate cache refresh when a circular dependency conflict exists, where when a cache used as a start point can be traced through cache tracing based on the dependency relationship by using any cache as a start point, the circular dependency conflict exists.

An embodiment of the present specification further proposes a device for processing information at user equipment, where the device includes a memory configured to store a computer program instruction and a processor configured to execute a program instruction, and when the computer program instruction is executed by the processor, the device is triggered to execute the method in the embodiments of the present specification.

The previous at least one technical solution used in the embodiments of the present specification can achieve the following beneficial effects: Based on the method in the embodiments of the present specification, the caches in the cascade cache are sequentially refreshed based on the cache dependency relationship, to manage refreshing of the cascade cache. Compared with the existing technology, when the cascade cache is refreshed based on the method in the embodiments of the present specification, the following problem can be effectively alleviated: Data resource pressure is caused because cache data resources are repeatedly and centrally invoked, and cached data is inconsistent because data is changed during cache refreshing.

BRIEF DESCRIPTION OF DRAWINGS

The accompanying drawings described here are intended to provide a further understanding of the present application, and constitute a part of the present application. The illustrative embodiments of the present application and descriptions thereof are intended to describe the present application, and do not constitute limitations on the present application. In the accompanying drawings.

DESCRIPTION OF EMBODIMENTS

To make the objectives, technical solutions, and advantages of the present application clearer, the following clearly and comprehensively describes the technical solutions of the present application with reference to specific embodiments and accompanying drawings of the present application. Clearly, the described embodiments are merely some rather than all of the embodiments of the present application. All other embodiments obtained by a person of ordinary skill in the art based on the embodiments of the present application without creative efforts shall fall within the protection scope of the present application.

In existing technology, cache refreshing is usually managed through isolation, and caches are refreshed and controlled independently of each other. However, because there is a dependency relationship between caches in a cascade cache, if refreshing is managed through isolation, cluster refreshing data resources are repeatedly and centrally invoked, and data resource performance can be affected. In addition, if data is changed during cache refreshing, a difference between basic data resources of the caches can be caused, and cached data can be inconsistent.

To alleviate the previous problem, the present specification proposes a cascade cache refreshing method. In the embodiments of the present specification, an application scenario in the existing technology is first analyzed. In an application scenario, a cascade cache is characterized by the following two features: (1) there are a plurality of caches; and (2) there is a dependency relationship between caches. In an application scenario, to ensure consistency between data cached by caches having a dependency relationship in the cascade cache, when cache 1 is refreshed, cache 2 that depends on cache 1 also needs to be refreshed. Further, after cache 2 is refreshed, cache 3 that depends on cache 2 also needs to be refreshed. That is, the cascade cache is refreshed in an association way.

If refreshing of each cache in the cascade cache is managed through isolation, it is equivalent to ignoring the dependency relationship between the caches and considering each cache as an independent cache. Consequently, after a cache is refreshed, an associated cache having a dependency relationship with the cache may not be refreshed synchronously. If data is changed during cache refreshing, a difference between basic data resources of the caches can be caused, and cached data can be inconsistent. In addition, the caches are refreshed and controlled independently of each other, and the cached data is also isolated from each other. Consequently, cluster refreshing data resources are repeatedly and centrally invoked, and data resource performance is affected.

As such, in an embodiment of the present specification, to ensure that caches having a dependency relationship with each other can be refreshed synchronously, caches having a dependency relationship in the cascade cache are used as a whole, and are refreshed synchronously during refreshing.

Further, the cascade cache is refreshed in an association way. As such, if a cache refreshing sequence is not considered when all the caches are refreshed synchronously, a cache that a certain cache depends on may be refreshed only after the cache is refreshed. As a result, the cache needs to be refreshed again to keep consistent with data cached by the cache that the cache depends on.

Further, because the dependency relationship between the caches in the cascade cache is often not a simple dependency chain, when different caches are triggered to be refreshed, caches that need to be refreshed synchronously and that have a dependency relationship are also different. If all caches are refreshed each time refreshing is triggered, a refreshing operation may be performed on a cache that does not need to be refreshed, and processing resources are wasted.

As such, in an embodiment of the present specification, the caches in the cascade cache are not refreshed randomly. Instead, a fixed refreshing sequence is determined based on the dependency relationship between the caches, and the caches are refreshed in a refreshing round based on the refreshing sequence. In addition, in a refreshing process, it is first determined whether the cache needs to be refreshed in a current refreshing round. If the cache does not need to be refreshed, the cache is not refreshed in the current refreshing round.

In an embodiment of the present specification, the method includes: sequentially determining, based on a cache refreshing sequence, whether caches in a cascade cache need to be refreshed, and refreshing a cache that needs to be refreshed, where the cache refreshing sequence is determined based on a dependency relationship between the caches in the cascade cache; and when it is determined that a current cache needs to be refreshed, determining whether a cache following the current cache in the cache refreshing sequence needs to be refreshed after the current cache is refreshed.

Based on the method in the embodiments of the present specification, the caches in the cascade cache are sequentially refreshed based on the cache dependency relationship, to manage refreshing of the cascade cache. Compared with the existing technology, when the cascade cache is refreshed based on the method in the embodiments of the present specification, the following problem can be effectively alleviated: Data resource pressure that is caused because cache data resources are repeatedly and centrally invoked, and inconsistent cached data that is caused because data is changed during cache refreshing.

The technical solutions provided in the embodiments of the present specification are described in detail below with reference to the accompanying drawings.

Figure 1:
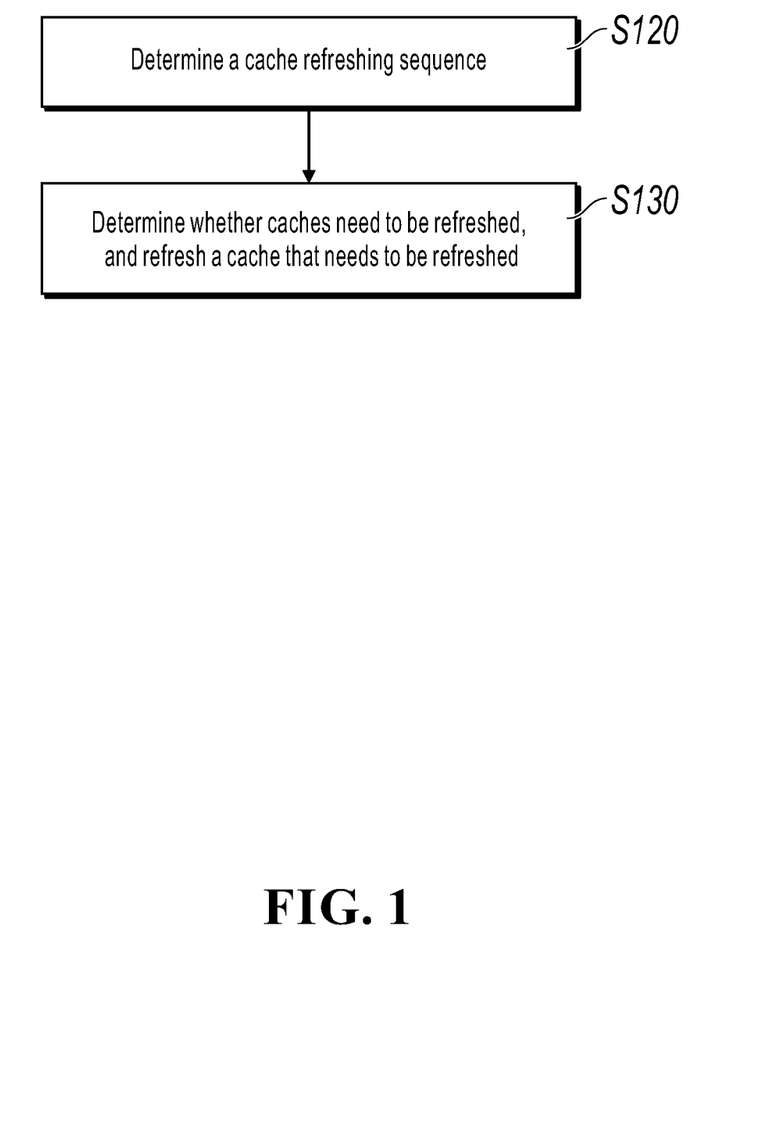
FIG. 1 and FIG. 5 are flowcharts illustrating an application program running method, according to an embodiment of the present specification.

In an embodiment of the present specification, as shown in FIG. 1, the method includes the following steps:

S120. Determine a cache refreshing sequence based on a dependency relationship between caches in a cascade cache.

S130. Sequentially determine, based on the cache refreshing sequence, whether the caches need to be refreshed, and refresh a cache that needs to be refreshed, where when it is determined that a current cache needs to be refreshed, it is determined whether a cache following the current cache in the cache refreshing sequence needs to be refreshed after the current cache is refreshed.

Further, in an embodiment of the present specification, the method further includes: obtaining a cache definition of the cascade cache, and determining the dependency relationship between the caches in the cascade cache based on the cache definition.

Further, in an embodiment of the present specification, the cache refreshing sequence needs to be determined only in an initial process of initializing the cascade cache, and the cache refreshing sequence is stored after the cache refreshing sequence is obtained. In a subsequent cache refreshing process, the stored cache refreshing sequence only needs to be invoked, without repeating a step of generating the cache refreshing sequence each time cache refreshing is performed.

Further, in an embodiment of the present specification, the cache refreshing sequence is determined for all caches in the cascade cache. That is, the cache refreshing sequence is determined based on a dependency relationship between all the caches in the cascade cache, and the cache refreshing sequence includes each cache in the cascade cache.

Further, in an embodiment of the present specification, the cache refreshing sequence is determined for a part of caches in the cascade cache. That is, the cache refreshing sequence is determined based on a dependency relationship between a part of caches in the cascade cache, and the cache refreshing sequence includes a part of caches in the cascade cache.

Further, in an embodiment of the present specification, whether the caches need to be refreshed is determined for each cache in the cache refreshing sequence. That is, when it is sequentially determined, based on the cache refreshing sequence, whether the caches need to be refreshed, it is sequentially determined, starting from a cache ranking first in the cache refreshing sequence, whether each cache in the cache refreshing sequence needs to be refreshed. If the cache refreshing sequence includes all the caches in the cascade cache, in a process of determining whether the caches need to be refreshed, it is determined whether each cache in the cascade cache needs to be refreshed.

Further, in an embodiment of the present specification, whether the caches need to be refreshed is determined for a part of caches in the cache refreshing sequence. That is, when it is sequentially determined, based on the cache refreshing sequence, whether the caches need to be refreshed, it is sequentially determined, starting from a certain cache in the cache refreshing sequence, whether the cache and each cache or certain caches following the cache need to be refreshed.

Further, in an embodiment of the present specification, the cache refreshing sequence is stored after the cache refreshing sequence is obtained. At the same time, it is monitored whether the cache definition of the cascade cache is updated. If the cache definition of the cascade cache is updated, a new cache refreshing sequence is generated based on an updated cache definition, and the originally stored cache refreshing sequence is updated.

Figure 2:
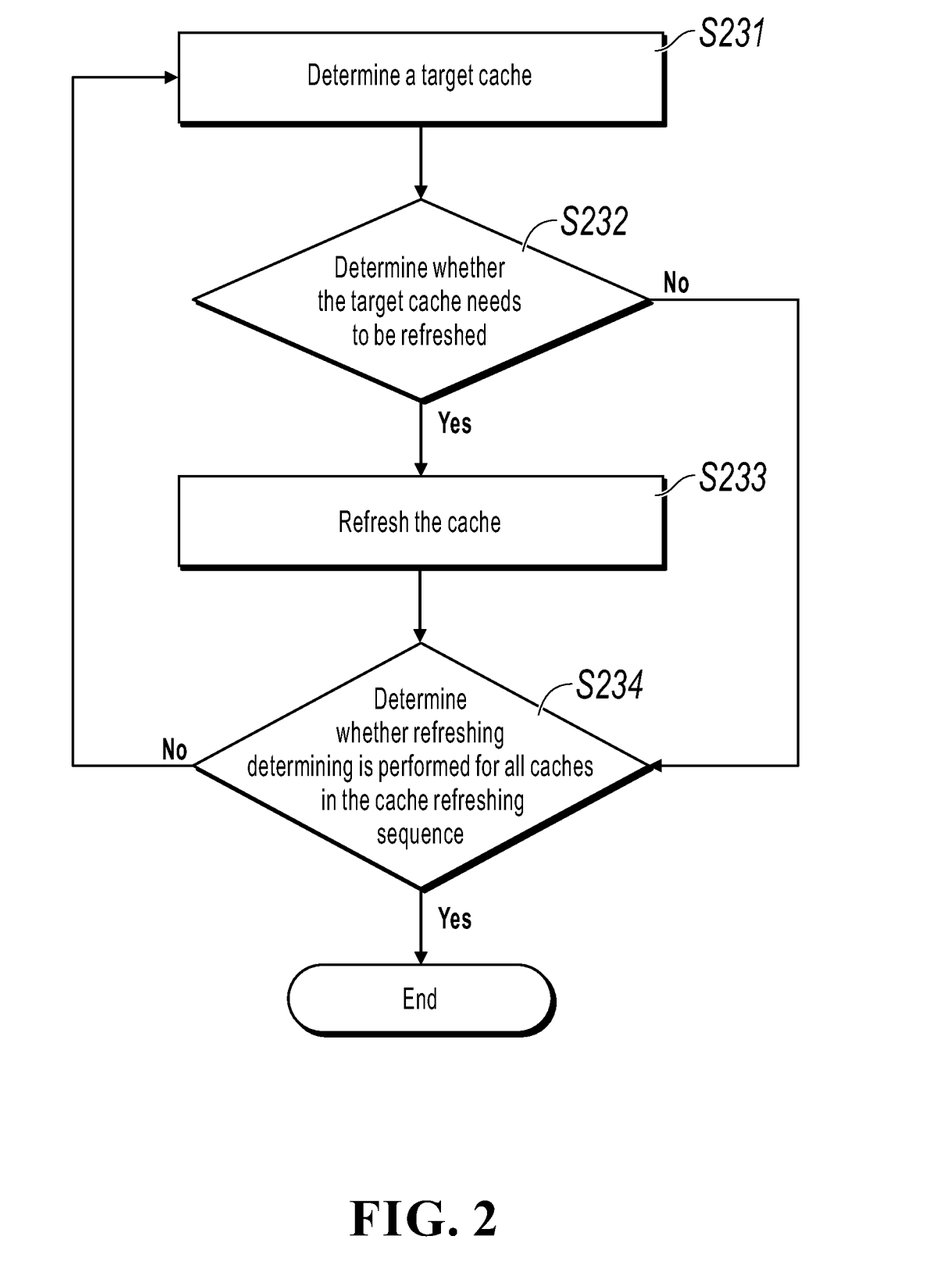
FIG. 2 and FIG. 3 are partial flowcharts illustrating an application program running method, according to an embodiment of the present specification.

In an embodiment of the present specification, as shown in FIG. 2, in a process of sequentially determining, based on the cache refreshing sequence, whether the caches need to be refreshed, and refreshing a cache that needs to be refreshed, the following steps are performed:

S231. Determine a target cache based on the cache refreshing sequence.

S232. Determine whether the target cache needs to be refreshed.

If the target cache needs to be refreshed, S233 is performed to refresh the cache, and the method proceeds to step S234.

If the target cache does not need to be refreshed, the method directly jumps to step S234.

S234. Determine whether step 232 (refreshing determining) is performed for all the caches in the cache refreshing sequence.

If yes, this round of cache refreshing ends.

If no, the method jumps to step S231.

Further, the cascade cache is refreshed in an association way. As such, assume that cache 2 depends on cache 1 and cache 3 depends on cache 2. On this assumption, further, if cache 1 depends on cache 3, a circular dependency relationship chain (cache 1-cache 2-cache 3-cache 1) is formed. If any cache on the circular dependency relationship chain is refreshed, an infinite refreshing sequence is formed. Consequently, refreshing may not be stopped, and an execution conflict may be generated.

As such, in an embodiment of the present specification, the method further includes: detecting whether a circular dependency conflict exists, and terminating cache refresh when a circular dependency conflict exists, where when a cache used as a start point can be traced through cache tracing based on the dependency relationship by using any cache as a start point, the circular dependency conflict exists.

In an embodiment of the present specification, in a process of determining the dependency relationship between the caches in the cascade cache based on the cache definition, it is detected whether a circular dependency conflict exists.

Figure 3:
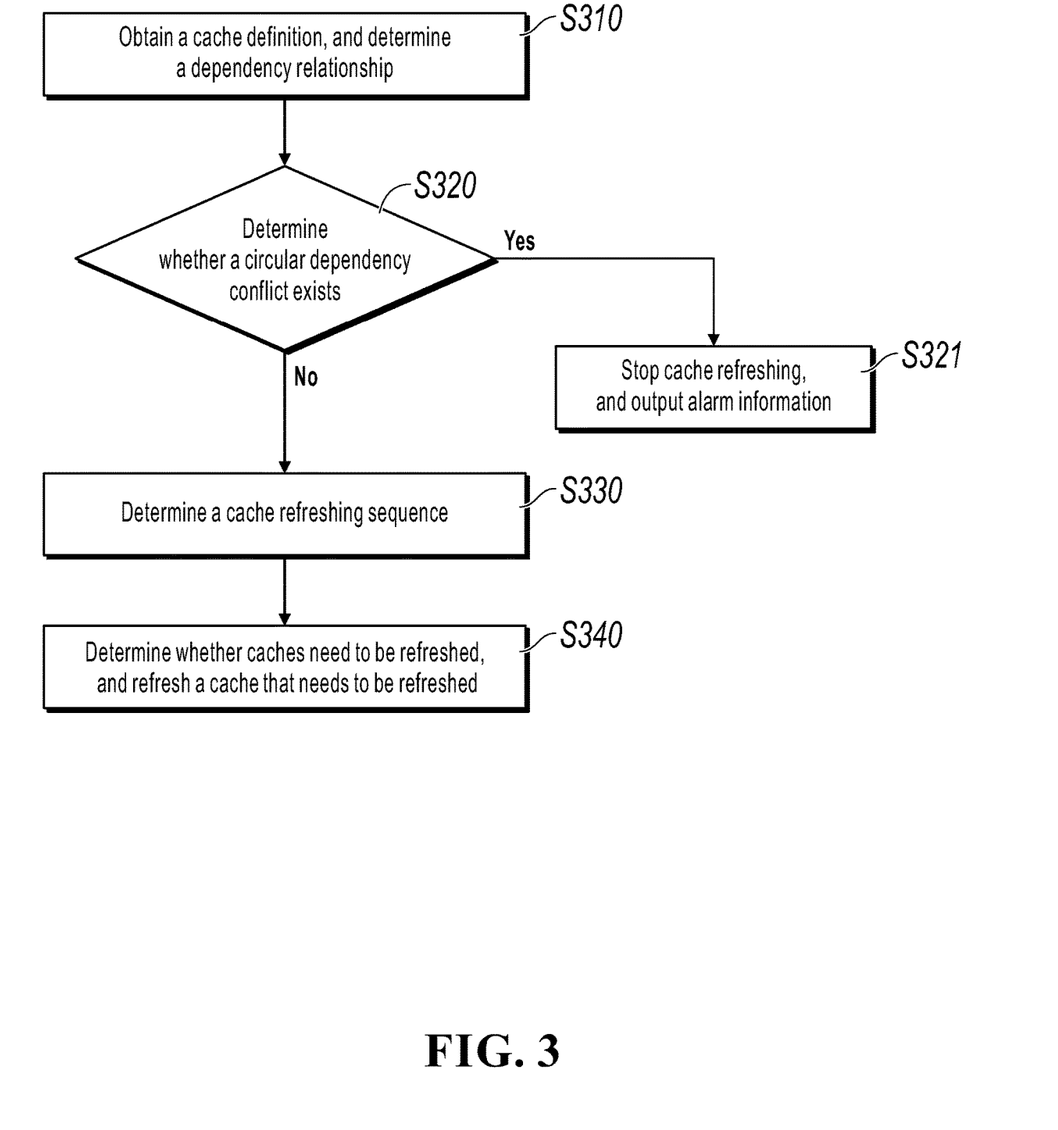

In an embodiment of the present specification, as shown in FIG. 3, the method includes the following steps:

S310. Obtain the cache definition of the cascade cache, and determine the dependency relationship between the caches in the cascade cache based on the cache definition.

S320. Determine, based on the dependency relationship between the caches in the cascade cache, whether a circular dependency conflict exists.

If yes, S321 is performed to stop cache refreshing and output alarm information.

If no, S330 is performed to determine the cache refreshing sequence based on the dependency relationship between the caches in the cascade cache.

S340. Sequentially determine, based on the cache refreshing sequence, whether the caches need to be refreshed, and refresh the cache that needs to be refreshed.

In an embodiment of the present specification, in a process of determining the dependency relationship between the caches in the cascade cache based on the cache definition, the following steps are performed: obtaining each cache dependency sequence chain based on the cache dependency relationship; and determining whether a same cache identifier exists in the cache dependency sequence chain; and if yes, determining that a circular dependency conflict exists in the cache cascade relationship.

In an example of an application scenario, a dependency relationship of a certain cascade cache is as follows: cache A depends on cache C and cache E; cache B depends on cache A and cache F; and cache D depends on cache B and cache A.

As such, formed cache dependency sequence chains are as follows: cache D-cache B-cache A-cache C; cache D-cache B-cache A-cache E; cache B-cache A-cache C; cache B-cache A-cache E; cache B-cache F; cache A-cache C; and cache A-cache E.

In the previous cache dependency sequence chains, because there is no cache dependency sequence chain includes two or more same cache identifiers, no circular dependency conflict exists.

In the previous application scenario, if a dependency relationship, that is, cache C depends on cache B, is added for the cascade cache, the following cache dependency sequence chain is formed: cache D-cache B-cache A-cache C-cache B. There are two cache B on the cache dependency sequence chain, a circular dependency conflict is caused.

Further, in an embodiment of the present specification, in a process of determining the cache refreshing sequence, a cache priority is determined based on the dependency relationship, and the cache refreshing sequence is determined based on all cache priorities, where a cache that does not depends on any cache has a highest priority; and when a first cache depends on a second cache, a priority of the first cache is lower than a priority of the second cache.

In an embodiment of the present specification, the cache refreshing sequence is formed in descending order of priorities.

In an example of an application scenario, a dependency relationship of a certain cascade cache is as follows: cache A depends on cache C and cache E; cache B depends on cache A and cache F; and cache D depends on cache B and cache A.

Figure 4:
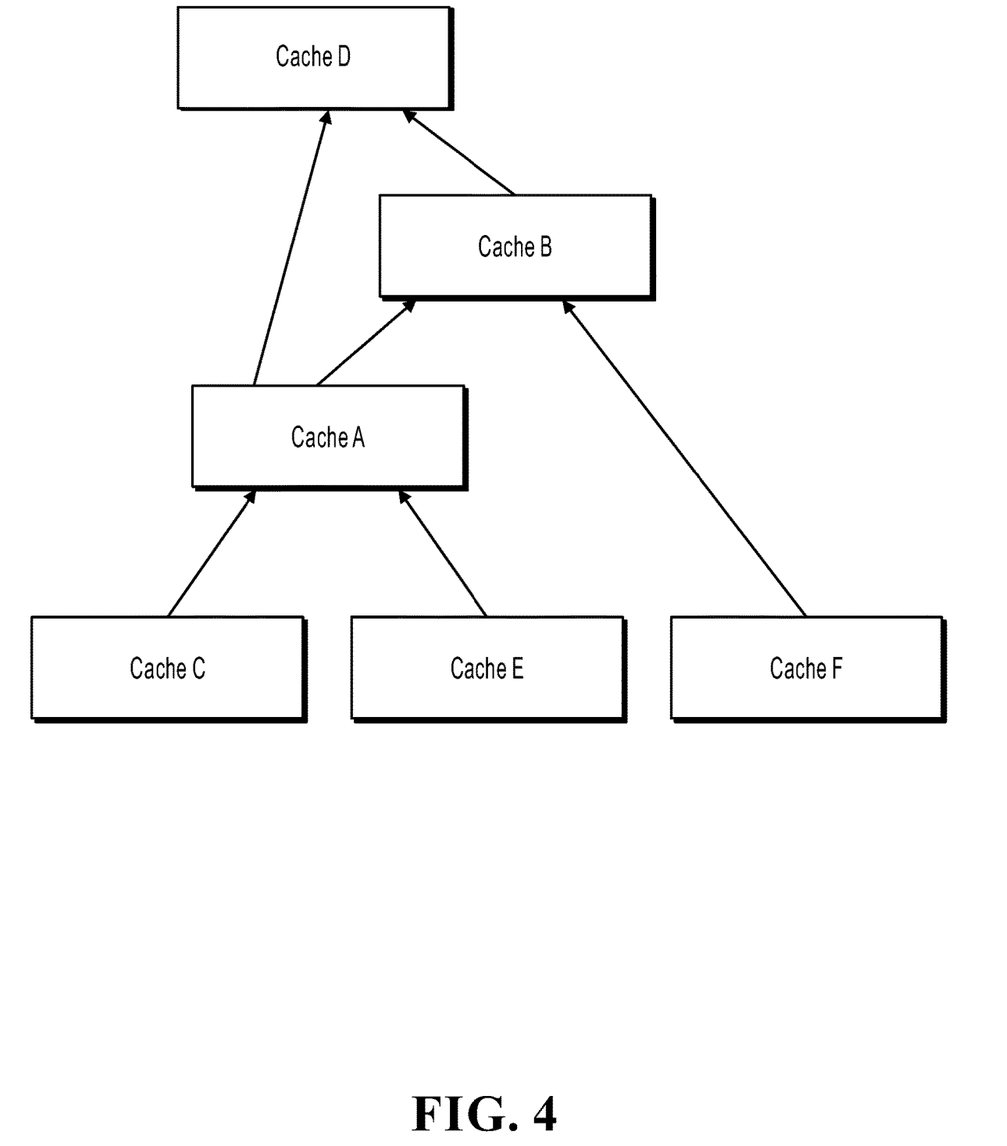
FIG. 4 is a schematic diagram illustrating a cache dependency relationship tree of a cascade cache, according to an embodiment of the present specification.

As such, a formed cache dependency sequence tree is shown in FIG. 4. The following can be obtained based on the cache dependency sequence tree:

Because cache C, cache E, and cache F do not depend on another cache, cache C, cache E, and cache F have a highest priority (which is set to 1); because cache A depends on cache C and cache E, cache A has a lower priority than cache C and cache E, and because priorities of both cache C and cache E are 1, the priority of cache A is 2; because cache B depends on cache A and cache F, cache B has a lower priority than cache A and cache F, and because the priority of cache A is 2 and the priority of cache F is 1, to ensure that cache B has a lower priority than cache A and cache F, the priority of cache B is 3; and because cache D depends on cache B and cache A, cache D has a lower priority than cache B and cache A, and because the priority of cache A is 2 and the priority of cache B is 3, to ensure that cache D has a lower priority than cache A and cache B, the priority of cache B is 4.

Finally, the following cache refreshing sequence is formed in descending order of priorities: cache C-cache E-cache F-cache A-cache B-cache D.

In the previous cache refreshing sequence, because cache C, cache E, and cache F have a same priority, rankings of the three caches can be randomly changed.

Further, in an embodiment of the present specification, when it is determined whether a cache needs to be refreshed, it is determined, based on a cache that the cache depends on, whether the cache needs to be refreshed.

Further, in an embodiment of the present specification, when it is determined whether a cache needs to be refreshed, it is determined whether the cache is externally triggered to be refreshed.

Further, in an embodiment of the present specification, when it is determined whether a cache needs to be refreshed, it is determined whether the cache is externally triggered to be refreshed. When the cache is not externally triggered to be refreshed, it is determined, based on a cache that the cache depends on, whether the cache needs to be refreshed.

In an embodiment of the present specification, a refreshing tag is added to a refreshing target when cache refreshing is externally triggered. When it is determined whether the cache is externally triggered to be refreshed, it is determined whether the cache has the refreshing tag. Further, the refreshing tag is canceled after a cache with the refreshing tag is refreshed.

Further, in an embodiment of the present specification, when it is determined, based on the cache that the cache depends on, whether the cache needs to be refreshed, the first cache needs to be refreshed when there is a cache whose refreshing time is later than a refreshing time of the first cache among all caches that the first cache depends on.

Further, in an embodiment of the present specification, before it is sequentially determined, by invoking the cache refreshing sequence, whether each cache in the cascade cache needs to be refreshed, it is first determined whether refreshing determining needs to be performed for the cascade cache. If no refreshing determining needs to be performed for the cascade cache, there is no need to sequentially determine, by invoking the cache refreshing sequence, whether each cache in the cascade cache needs to be refreshed.

In an embodiment of the present specification, when the cascade cache is externally triggered to be refreshed, it is determined that refreshing determining needs to be performed for the cascade cache. For example, if any cache in the cascade cache needs to be refreshed based on an external command, it is determined that refreshing determining needs to be performed for the cascade cache.

In an embodiment of the present specification, a refreshing time point is predetermined for the cascade cache. If a current moment satisfies the refreshing time point predetermined for the cascade cache, it is determined that refreshing determining needs to be performed for the cascade cache. For example, if it is predetermined that one round of refreshing is performed for the cascade cache at an interval of 10 minutes, refreshing determining needs to be performed for the cascade cache at an interval of 10 minutes.

Figure 5:
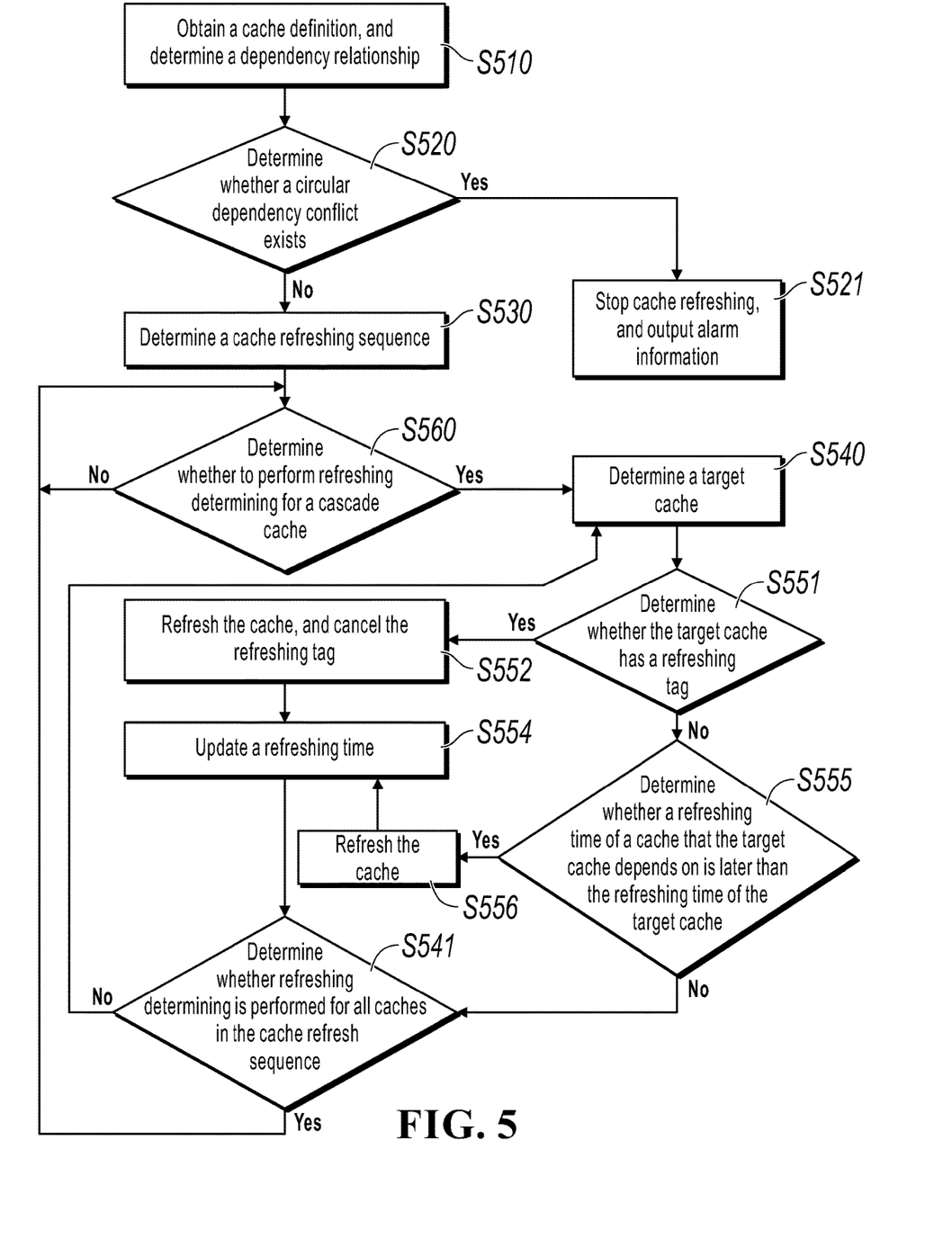

In an embodiment of the present specification, as shown in FIG. 5, the method includes the following steps:

S510. Obtain the cache definition of the cascade cache, and determine the dependency relationship between the caches in the cascade cache based on the cache definition.

S520. Determine, based on the dependency relationship between the caches in the cascade cache, whether a circular dependency conflict exists.

If yes, S521 is performed to stop cache refreshing and output alarm information.

If no, S530 is performed to determine the cache refreshing sequence based on the dependency relationship between the caches in the cascade cache.

S560. Determine whether to perform refreshing determining for the cascade cache.

If yes, the method jumps to step S540. If no, the method returns to step S560.

S540. Determine a target cache based on the cache refreshing sequence.

S551. Determine whether the target cache has a refreshing tag.

If the target cache has a refreshing tag, S552 is performed to refresh the cache and cancel the refreshing tag.

S554. Update a refreshing time, and jump to step S541.

If the target cache does not have a refreshing tag, S555 is performed to traverse a refreshing time of a cache that the cache depends on and determine whether the refreshing time of the cache that the cache depends on is later than the refreshing time of the cache.

If yes, S556 is performed to refresh the cache and jump to step S554.

If no, the method directly jumps to step S541.

S541. Determine whether refreshing determining is performed for all the caches in the cache refreshing sequence.

If yes, this round of cache refreshing ends, and the method jumps to step S560.

If no, the method jumps to step S540.

Further, in an embodiment of the present specification, in step S560, it is monitored whether cache refreshing is externally triggered and/or whether the current moment satisfies the refreshing time point of the cascade cache. If cache refreshing is externally triggered and/or the current moment satisfies the refreshing time point of the cascade cache, it is determined that the cascade cache needs to be refreshed.

Further, in an embodiment of the present specification, in step S540, a cache ranking first in the cache refreshing sequence is used as a cache on which refreshing determining is initially performed, to finally determine whether all the caches in the cache refreshing sequence need to be refreshed.

In an example of an application scenario, a dependency relationship of a certain cascade cache is as follows: cache A depends on cache C and cache E; cache B depends on cache A and cache F; and cache D depends on cache B and cache A.

Based on the method in an embodiment of the present specification, it is determined that no circular dependency conflict exists, to obtain the following cache refreshing sequence: cache C-cache E-cache F-cache A-cache B-cache D.

When cache C is externally triggered to be refreshed, a refreshing tag is added to cache C. The cache refreshing sequence is invoked, all the caches are traversed based on the cache refreshing sequence, and it is sequentially determined whether all the caches need to be refreshed, and a cache that needs to be refreshed is refreshed. An execution sequence is as follows:

(1) It is determined, based on the refreshing tag, that cache C needs to be refreshed, cache C is refreshed, and a refreshing time of cache C is updated.

(2) Cache E has no refreshing tag and has no dependent cache, and cache E is not refreshed.

(3) Cache F has no refreshing tag and has no dependent cache, and cache F is not refreshed.

(4) Cache A has no refreshing tag, and cache A depends on cache C and cache E, where because the refreshing time of cache C is later than a refreshing time of cache A, it is determined that cache A needs to be refreshed, cache A is refreshed, and the refreshing time of cache A is updated.

(5) Cache B has no refreshing tag, and cache B depends on cache A and cache F, where because the refreshing time of cache A is later than a refreshing time of cache B, it is determined that cache B needs to be refreshed, and cache B is refreshed.

(6) Cache D has no refreshing tag, and cache D depends on cache B and cache A, where because both the refreshing time of cache B and the refreshing time of cache A are later than a refreshing time of cache D, it is determined that cache D needs to be refreshed, and cache D is refreshed.

Further, in an embodiment of the present specification, in step S540, when cache refreshing is externally triggered, a target object (a cache to which a refreshing tag is added) for which cache refreshing is externally triggered is used as a cache on which refreshing determining is initially performed, to finally determine whether the target object for which cache refreshing is externally triggered and all caches following the target object in the cache refreshing sequence need to be refreshed. When the current moment satisfies the refreshing time point of the cascade cache, a cache ranking first in the cache refreshing sequence is used as a cache on which refreshing determining is initially performed, to finally determine whether all the caches in the cache refreshing sequence need to be refreshed.

Further, in an embodiment of the present specification, in step S540, a cache on which refreshing determining is initially performed is determined based on a refreshing trigger method. When cache refreshing is externally triggered, a target object (a cache to which a refreshing tag is added) for which cache refreshing is externally triggered is used as the cache on which refreshing determining is initially performed, to finally determine whether the target object for which cache refreshing is externally triggered and all caches following the target object in the cache refreshing sequence need to be refreshed.

Figure 6:
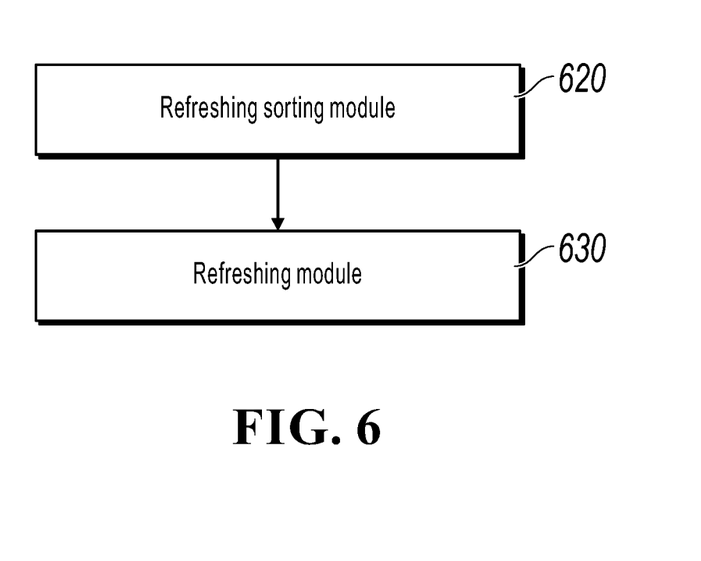
FIG. 6 and FIG. 7 are structural block diagrams of a system, according to an embodiment of the present specification.

Based on the method in the embodiments of the present specification, the embodiments of the present specification further propose a cascade cache refreshing system. As shown in FIG. 6, the system includes: a refreshing sorting module 620, configured to determine a cache refreshing sequence based on a dependency relationship; and a refreshing module 630, configured to sequentially determine, based on the cache refreshing sequence, whether caches need to be refreshed, and refresh a cache that needs to be refreshed, where when it is determined that a cache needs to be refreshed, it is determined whether a cache following the cache in the cache refreshing sequence needs to be refreshed after the cache is refreshed.

Further, in an embodiment of the present specification, the system further includes: a circular dependency detection unit, configured to detect whether a circular dependency conflict exists, and terminate cache refreshing when a circular dependency conflict exists, where when a cache used as a start point can be traced through cache tracing based on the dependency relationship by using any cache as a start point, the circular dependency conflict exists.

Figure 7:
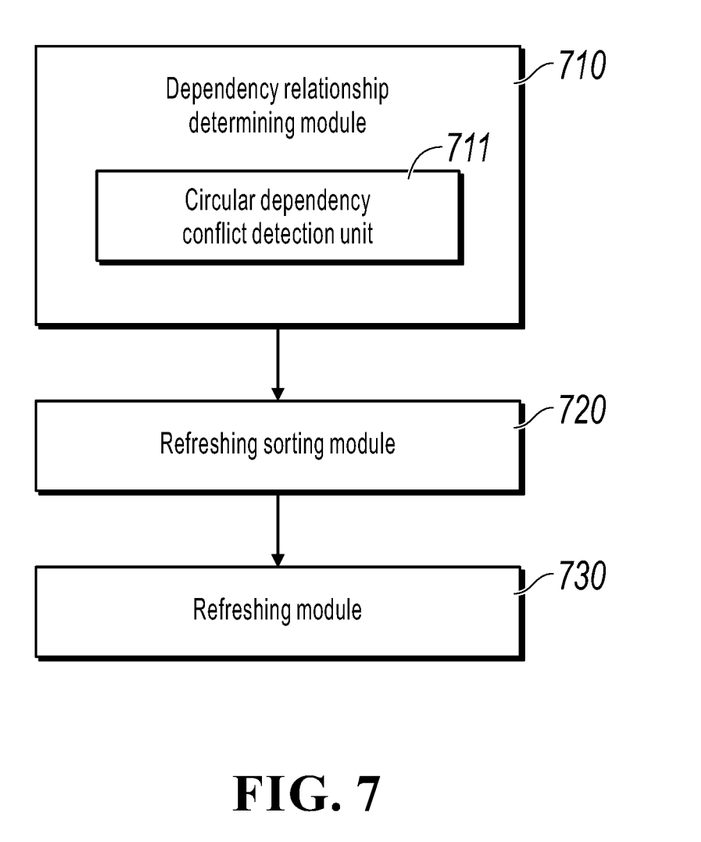

Specifically, in an embodiment of the present specification, as shown in FIG. 7, the system further includes a dependency relationship determining module 710. The dependency relationship determining module 710 is configured to obtain a cache definition, and determine the dependency relationship between caches in a cascade cache based on the cache definition. The dependency relationship determining module 710 includes a circular dependency detection unit 711.

Further, based on the method in the present disclosure, the present disclosure further proposes a device for processing information at user equipment, where the device includes a memory configured to store a computer program instruction and a processor configured to execute a program instruction, and when the computer program instruction is executed by the processor, the device is triggered to execute the method in the present disclosure.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an embodiment of the present disclosure can be provided as a method, a system, or a computer program product. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the calculating device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The embodiments in the present specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment.

The previous embodiments are embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method for refreshing a cascade cache, the method comprising:
    obtaining a dependency relationship between a plurality of caches in the cascade cache;
    determining, based on the dependency relationship, one or more cache priorities, wherein a particular cache that does not depend on any other cache has a higher priority than another cache that depends on a different cache;
    determining, based on the cache priorities, a cache refreshing sequence associated with the plurality of caches in the cascade cache;
    determining, based on the cache refreshing sequence, that a first cache of the plurality of caches is to be refreshed; and
    responsive to determining that the first cache is to be refreshed, refreshing the first cache; and determining whether a second cache of the plurality of caches, the second cache following the first cache in the cache refreshing sequence, is to be refreshed after the first cache is refreshed.

2. The computer-implemented method of claim 1, further comprising sequentially determining whether each cache in the cascade cache is to be refreshed.

3. The computer-implemented method of claim 1, wherein the method further comprises:
    detecting whether a circular dependency conflict exists, wherein the dependency relationship is used to detect whether the second cache is dependent upon itself;
    responsive to detecting that the circular dependency conflict exists, terminating cache refreshing; and
    responsive to detecting that the circular dependency conflict does not exist, continuing refreshing the cascade cache in accordance with the dependency relationship.

4. The computer-implemented method of claim 1, wherein determining the first cache is to be refreshed comprises:
    determining the first cache is not externally triggered to be refreshed.

5. The computer-implemented method of claim 4 further comprising:
    responsive to determining the first cache is not externally triggered to be refreshed, determining, based on a cache that the first cache depends on, whether the first cache is to be refreshed.

6. The computer-implemented method of claim 1, wherein determining the first cache is to be refreshed comprises:
    determining the first cache is externally triggered to be refreshed.

7. The computer-implemented method of claim 6 wherein determining the first cache is externally triggered to be refreshed comprises determining the first cache has a refreshing tag corresponding to an external trigger, and the method further comprises:
    responsive to determining the first cache has the refreshing tag corresponding to the external trigger, refreshing the first cache, and
    canceling the refreshing tag after refreshing the first cache.

8. The computer-implemented method of claim 1, wherein determining the first cache is to be refreshed comprises:

determining, based on a third cache that the first cache depends on, the first cache is to be refreshed.

9. The computer-implemented method of claim 8, wherein determining, based on the third cache that the first cache depends on, the first cache is to be refreshed comprises:
   determining that a refreshing time of the third cache is later than a refreshing time of the first cache;
   determining, based on the dependency relationship, that the first cache depends on the third cache; and
   determining, based on determining that the refreshing time of the third cache is later than the refreshing time of the first cache and, based on the dependency relationship, that the first cache depends on the third cache, that the first cache is to be refreshed.

10. A non-transitory, computer-readable medium storing one or more instructions executable by a computer system to perform operations comprising:
    obtaining a dependency relationship between a plurality of caches in a cascade cache;
    determining, based on the dependency relationship, one or more cache priorities, wherein a particular cache that does not depend on any other cache has a higher priority than another cache that depends on a different cache;
    determining, based on the cache priorities, a cache refreshing sequence associated with the plurality of caches in the cascade cache;
    determining, based on the cache refreshing sequence, that a first cache of the plurality of caches is to be refreshed; and
    responsive to determining that the first cache is to be refreshed, refreshing the first cache; and determining whether a second cache of the plurality of caches, the second cache following the first cache in the cache refreshing sequence, is to be refreshed after the first cache is refreshed.

11. The non-transitory, computer-readable medium of claim 10, further comprising sequentially determining whether each cache in the cascade cache is to be refreshed.

12. The non-transitory, computer-readable medium of claim 10, wherein the operations further comprise:
    detecting whether a circular dependency conflict exists, wherein the dependency relationship is used to detect whether the second cache is dependent upon itself;
    responsive to detecting that the circular dependency conflict exists, terminating cache refreshing; and
    responsive to detecting that the circular dependency conflict does not exist, continuing refreshing the cascade cache in accordance with the dependency relationship.

13. The non-transitory, computer-readable medium of claim 10, wherein determining the first cache is to be refreshed comprises:
    determining the first cache is not externally triggered to be refreshed.

14. The non-transitory, computer-readable medium of claim 13 further comprising:
    responsive to determining the first cache is not externally triggered to be refreshed, determining, based on a cache that the first cache depends on, whether the first cache is to be refreshed.

15. The non-transitory, computer-readable medium of claim 10, wherein determining the first cache is to be refreshed comprises:
    determining the first cache is externally triggered to be refreshed.

16. The non-transitory, computer-readable medium of claim 15 wherein determining the first cache is externally triggered to be refreshed comprises determining the first cache has a refreshing tag corresponding to an external trigger, and the operations further comprise:
    responsive to determining the first cache has the refreshing tag corresponding to the external trigger, refreshing the first cache, and
    canceling the refreshing tag after refreshing the first cache.

17. The non-transitory, computer-readable medium of claim 10, wherein determining the first cache is to be refreshed comprises:
    determining, based on a third cache that the first cache depends on, the first cache is to be refreshed.

18. The non-transitory, computer-readable medium of claim 17, wherein determining, based on the third cache that the first cache depends on, the first cache is to be refreshed comprises:
    determining that a refreshing time of the third cache is later than a refreshing time of the first cache;
    determining, based on the dependency relationship, that the first cache depends on the third cache; and
    determining, based on determining that the refreshing time of the third cache is later than the refreshing time of the first cache and, based on the dependency relationship, that the first cache depends on the third cache, that the first cache is to be refreshed.

19. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    obtaining a dependency relationship between a plurality of caches in a cascade cache;
    determining, based on the dependency relationship, one or more cache priorities, wherein a particular cache that does not depend on any other cache has a higher priority than another cache that depends on a different cache;
    determining, based on the cache priorities, a cache refreshing sequence associated with the plurality of caches in the cascade cache;
    determining, based on the cache refreshing sequence, that a first cache of the plurality of caches is to be refreshed; and
    responsive to determining that the first cache is to be refreshed, refreshing the first cache;
    and determining whether a second cache of the plurality of caches, the second cache following the first cache in the cache refreshing sequence, is to be refreshed after the first cache is refreshed.

20. The computer-implemented system of claim 19, further comprising sequentially determining whether each cache in the cascade cache is to be refreshed.

21. The computer-implemented system of claim 19, wherein the operations further comprise:
    detecting whether a circular dependency conflict exists, wherein the dependency relationship is used to detect whether the second cache is dependent upon itself;
    responsive to detecting that the circular dependency conflict exists, terminating cache refreshing; and responsive to detecting that the circular dependency conflict does not exist, continuing refreshing the cascade cache in accordance with the dependency relationship.

22. The computer-implemented system of claim 19, wherein determining the first cache is to be refreshed comprises:
   determining the first cache is not externally triggered to be refreshed.

23. The computer-implemented system of claim 22 further comprising:
   responsive to determining the first cache is not externally triggered to be refreshed, determining, based on a cache that the first cache depends on, whether the first cache is to be refreshed.

24. The computer-implemented system of claim 19, wherein determining the first cache is to be refreshed comprises:
   determining the first cache is externally triggered to be refreshed.

25. The computer-implemented system of claim 24 wherein determining the first cache is externally triggered to be refreshed comprises determining the first cache has a refreshing tag corresponding to an external trigger, and the operations further comprise:

responsive to determining the first cache has the refreshing tag corresponding to the external trigger, refreshing the first cache, and canceling the refreshing tag after refreshing the first cache.

26. The computer-implemented system of claim 19, wherein determining the first cache is to be refreshed comprises:
   determining, based on a third cache that the first cache depends on, the first cache is to be refreshed.

27. The computer-implemented system of claim 26, wherein determining, based on the third cache that the first cache depends on, the first cache is to be refreshed comprises:
   determining that a refreshing time of the third cache is later than a refreshing time of the first cache;
   determining, based on the dependency relationship, that the first cache depends on the third cache; and
   determining, based on determining that the refreshing time of the third cache is later than the refreshing time of the first cache and, based on the dependency relationship, that the first cache depends on the third cache, that the first cache is to be refreshed.

* * * * *